Oct. 27, 1936.  E. PRICE  2,059,028

BRAKE APPARATUS

Filed May 20, 1936

Inventor:
Edgar Price,
by Harry E. Dunham
His Attorney.

Patented Oct. 27, 1936

2,059,028

UNITED STATES PATENT OFFICE 2,059,028

BRAKE APPARATUS

Edgar Price, Schenectady, N. Y., assignor to General Electric Company, a corporation of New York Application May 20, 1936, Serial No. 80,727

5 Claims. (Cl. 188—171)

My invention relates to brake apparatus of the disk type wherein the brake is applied by spring means and is released by electromagnetic means. It is the object of my invention to provide an improved brake apparatus of this type having improved means for manually releasing the brake.

My invention will be better understood from the following description taken in connection with the accompanying drawing, and its scope will be pointed out in the appended claims.

Figure 1:
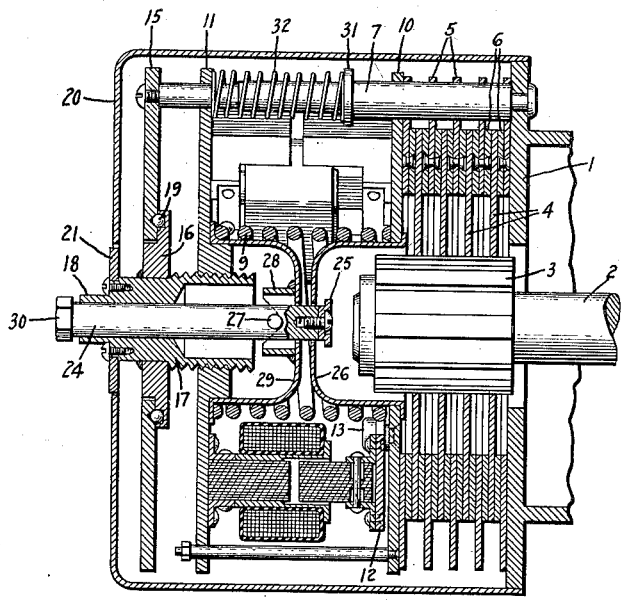
Figure 2:
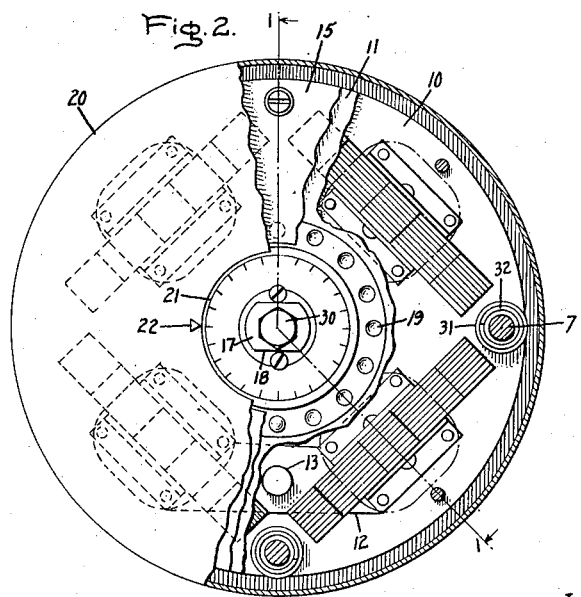

Referring to the drawing, Fig. 1 is a longitudinal sectional view taken on lines 1—1 of Fig. 2 of brake apparatus comprising one embodiment of my invention, and Fig. 2 is an end view of the brake shown in Fig. 1 with portions broken away.

At 1 I have shown an end plate which may be formed integral with the frame of a machine, such as an electric motor, to which the brake is applied and 2 represents the rotatable shaft of such a machine. This shaft has the enlargement 3 which preferably is splined and on this splined enlargement there are a plurality of friction disks 4 which are suitably shaped to engage the splines but which are free to have a limited longitudinal movement. For frictionally engaging the rotatable disks 4 there are the stationary disks 5 whose faces are provided with suitable friction material 6 and which are mounted for longitudinal movement on a number of rods 7 which are fixed as by riveting to the end plate.

The brake is applied, that is, the cooperating plates 4 and 5 are pressed together by the compression spring 9. The force of the spring is transmitted to the cooperating plates through the non-rotatable plate 10 which is mounted for sliding movement on the rods 7 like disks 5. A similar non-rotatable plate 11 also slidably mounted on the rods 10 forms an abutment for the spring 9 and is adapted to have its position adjusted to vary the tension of the spring. The brake is released by electromagnetic means whose construction is similar to that shown in my Patent No. 2,009,121 of July 23, 1935. As shown on the drawing this electromagnetic means comprises four electromagnets of which the field elements are secured to the plate 11 and the armature elements are secured to the plate 10 whereby an energization of the magnets serves to draw plates 10 and 11 toward each other thus compressing the spring 9 and releasing the brake. Instead of employing the expedient shown in the above-mentioned patent for providing in effect a three point connection of the electromagnetic means with the plate 10, I have shown the armatures of two adjacent magnets secured to the ends of the yoke 12, the middle point of which is loosely attached by the stud 13 to the plate 10.

Mounted on the ends of the rods 7 is the fixed plate 15 and engaging this plate is the central rotatable plate 16 to which is fixed, as by welding, the brake adjusting screw 17. This screw has threaded engagement with the plate 11 and on its outer end is shown having two flat sides 18 by which a suitable wrench may be applied for changing the adjustment of the brake. To hold the adjusting screw in adjusted position plates 15 and 16 are provided with a detent comprising a series of balls 19 each mounted in a separate recess in the plate 16 and adapted to engage in a series of recesses formed in the plate 15. The apparatus is enclosed by the outer casing 20 which firmly engages the end plate 1 at one end and which is provided with a circular central opening at its opposite end which receives the graduated disk 21 carried by the adjusting screw. The outer casing 20 is provided with a reference mark as shown at 22 which cooperates with the graduations on the disk 21 whereby an indication is given of the adjustment of the brake.

As is common with apparatus of this character the brake is provided with manually operable means for effecting the release of the brake independently of the electromagnetic means. This manual release in my present invention comprises the rod 24 which extends centrally of the brake and is mounted in adjusting screw 17. At the inner end of the rod 24 is the detachable flange 25 which is adapted to engage the central part of the shell or cup 26 whose outer portion terminates in a flange secured to the plate 10. Rod 24 is also provided with the pin 27 which is adapted to engage the cam 28, shown in the form of a hollow cylinder, which is secured to the central part of another shell or cup 29 whose opposite end terminates in a flange which is secured to the plate 11. The outer end of the rod 24 is shown having the hexagon head 30 to which a suitable wrench may be applied. By giving the rod 24 a partial turn to cause the pin 27 to ride on the cam 28 the rod draws together the two cups 26 and 29 compressing the spring 9 and withdrawing the plate 10 from the friction disks a sufficient amount to release the brake and hold it in released position until the rod is rotated forward or backward to the brake applied position. On each rod 7 I have provided a collar 31 and a light spring 32 between that collar and the plate 11 whereby the two plates 10 and 11 and associated parts are moved to a position away from the friction disks when the brake is released and also to hold the disk 16 at such times against the plate 15.

What I claim as new and desire to secure by Letters Patent of the United States is:

1. Brake apparatus comprising a rotatable disk, a plurality of non-rotatable plates, spring means between said plates arranged to move one of the plates into frictional engagement with said disk to apply the brake, electromagnetic means between the plates for withdrawing said one plate from the disk to release the brake, a screw threaded into the other of said plates for adjusting said spring means and manual means for releasing the brake comprising a rod mounted in said screw and means cooperating with said plates for moving them against said spring means in response to a rotative adjustment of said rod.

2. Brake apparatus comprising a rotatable disk, a plurality of axially movable non-rotatable plates, a spring between said plates for moving one plate into engagement with said disk to apply the brake, electromagnetic means secured to said plates for overcoming said spring to release the brake, a fixed plate, a spring adjusting screw mounted in said fixed plate and threaded into the other of said plates, a manual brake release rod mounted in said screw and means comprising a cam operated in response to a rotative adjustment of the rod for drawing said movable plates together to compress the spring.

3. Brake apparatus comprising a rotatable disk, a plurality of axially movable non-rotatable plates, a spring between said plates for moving one plate into engagement with said disk to apply the brake, electromagnetic means secured to said plates for overcoming said spring to release the brake, a fixed plate, a spring adjusting screw mounted in said fixed plate and threaded into the other of said plates, a manual brake release rod mounted in said screw, means connecting said rod with one of said plates and means including a cam for connecting said rod with the other of said plates.

4. Brake apparatus comprising a rotatable disk, a plurality of axially movable non-rotatable plates, a spring between said plates for moving one plate into engagement with said disk to apply the brake, electromagnetic means secured to said plates for overcoming said spring to release the brake, a fixed plate, a spring adjusting screw mounted in said fixed plate and threaded into the other of said plates, a manual brake release rod mounted in said screw, a plurality of reversely mounted cups each secured to one of said plates, said rod having a flange engaging one of said cups and a cam device connecting the rod with the other of said cups.

5. Brake apparatus comprising cooperating friction disks, mechanism for pressing said disks together comprising spaced plates and an interposed spring, means for moving said plates together to release the brake and resilient means for urging said mechanism and means in a direction to effect full release of the brake.

EDGAR PRICE.